July 19, 1932.  L. B. WITHERS  1,867,692

TROLLEY RETRIEVER

Filed Aug. 18, 1930

Inventor
Lewis B. Withers;

By Lyon & Lyon
Attorneys

Patented July 19, 1932

1,867,692

UNITED STATES PATENT OFFICE

LEWIS B. WITHERS, OF GLENDALE, CALIFORNIA

TROLLEY RETRIEVER

Application filed August 18, 1930. Serial No. 475,960.

This invention relates to a trolley retriever, that is to say, mechanism associated with the trolley pole mounted on an electric car and operating to lower the pole in case the trolley wheel becomes dislodged from the trolley wire. Devices for this purpose have been employed heretofore, but as usually constructed they are brought into action by an upward movement of the pole, and this movement is utilized in the vicinity of the pivot of the trolley pole at the roof of the car. Hence, these devices have a tendency to be delayed in their operation. For this reason they may permit the trolley wheel to strike overhead guy wires and to injure the overhead supports for the trolley wire.

The general object of this invention is to produce a trolley retriever of simple construction which is controlled by a relative movement between the harp and the upper end of the pole, and does not depend upon a considerable upward movement of the pole to start the mechanism that lowers the pole.

A further object of the invention is to provide a device of this kind operated by compressed air which is available on electric cars for use on their brakes.

A further object of the invention is to provide a construction whereby a slight movement of the harp relative to the pole occasioned when the wheel is off the wire, will effect a release of air which will automatically effect the functioning of the mechanism that lowers the pole.

Further objects of the invention will appear hereinafter.

The invention consists of the novel parts and combination of parts to be described hereinafter, all of which contribute to produce an efficient trolley retriever.

A preferred embodiment of the invention is described in the following specification, while the broad scope of the invention is pointed out in the appended claims.

Figure 1:
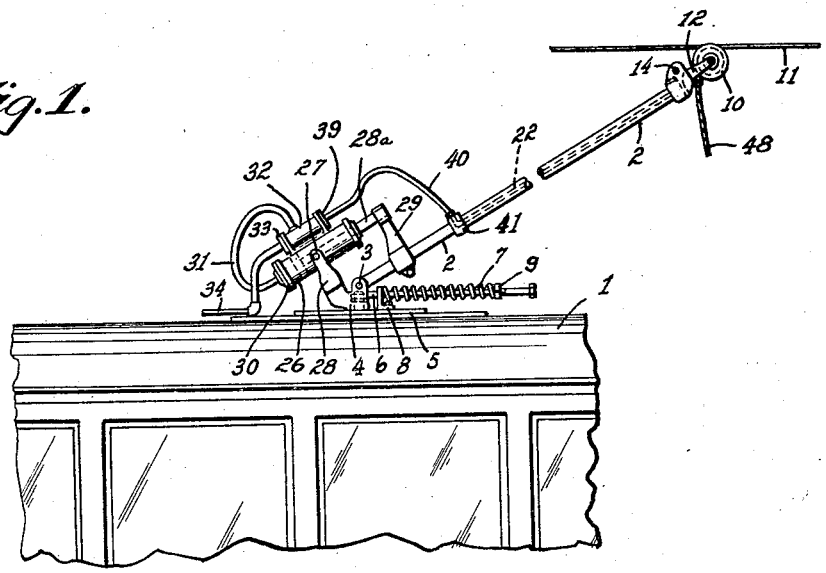
Fig. 1 is a side elevation showing a portion of the roof and side of an electric car, and illustrating an embodiment of my invention applied thereto, together with a short portion of a trolley wire, a portion of the trolley pole being broken away.

In practicing the invention, I mount the harp that carries the trolley wheel so that it is capable of relative movement on the end of the pole. When the trolley wheel gets off of the trolley wire, relative movement takes place between the harp and the pole, and I utilize this movement to effect the actuation of the mechanism to lower the pole. This may be accomplished by any means desired, but preferably through the medium of a control valve that permits the escape of air on account of the relative movement referred to.

This actuates a pneumatic valve that controls flow of compressed air to the operating cylinder that is connected with the trolley pole for lowering it.

Referring to the drawing, 1 represents the roof of a trolley car. This car carries a trolley pole 2, the lower end of which is attached by a pivot bolt 3 to a carriage in the form of a bracket 4 that is rigidly mounted on a base plate 5 on the car roof. Adjacent to the pivot bolt 3 the underside of the pole is connected to a stem 6 that is provided with a helical spring 7 thrusting against the fixed bracket 8, and pressing against an adjustable nut 9 on the stem 6. In this way the spring exerts a pull on the trolley pole tending to swing it upwardly and thereby holding the trolley wheel 10 against the underside of the trolley wire 11. Any construction for this purpose may be used.

The trolley wheel 10 is mounted on a movable member, such as a harp 12, the lower end of which is supported movably on a short arm 13 mounted on a pivot bolt 14. This pivot bolt is carried in the forks 15 of a head 16 attached to the upper end of the trolley pole 2. When the wheel 10 is resting against the underside of the wire a coil spring 17, recessed into the arm 13, is held in a state of compression and thrusting against an upper end face 18 of the head 16.

When the trolley wheel comes off of the wire this spring causes an anti-clockwise rotation of the harp on the pivot bolt 14, and this movement is utilized to open a control valve 19. In order to accomplish this the arm 13 may be provided with a toe 20 that engages the stem of the valve. This valve 19 is normally held on its seat by coil spring 21. I utilize this control valve to control the admission of compressed air for retrieving the trolley. In the present instance this is accomplished by permitting air to escape from the upper end of the trolley pole. For this purpose the trolley pole is provided with an air duct 22 which communicates with a similar duct 23 in the head 16, and this duct 23 leads into the valve chamber 24 of the valve 19.

Figures 2, 3:
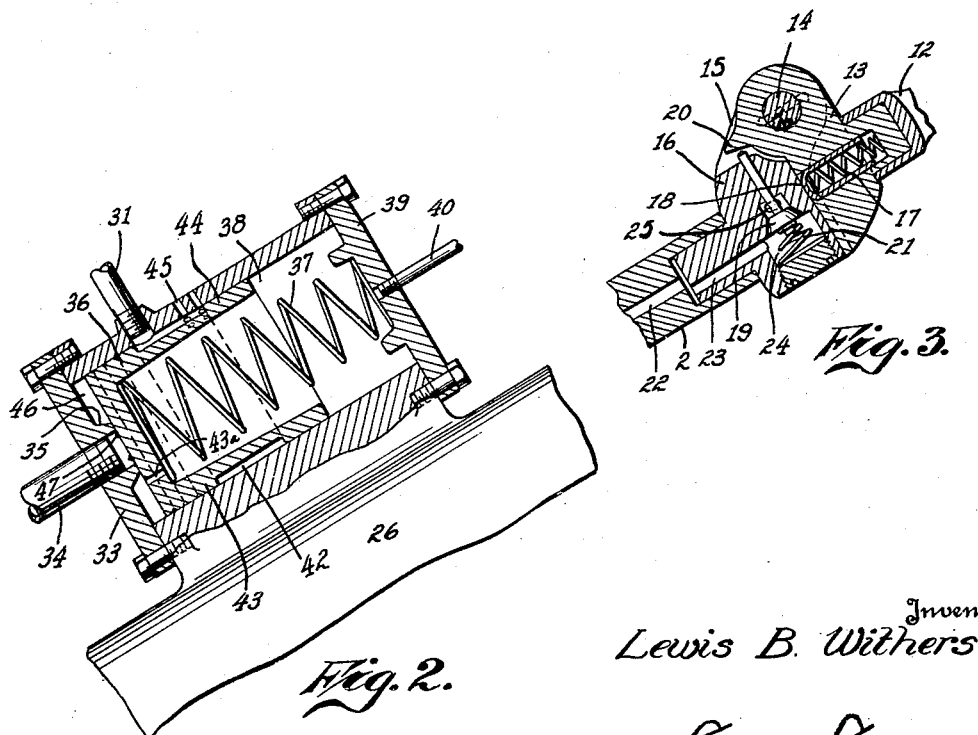
Fig. 2 is a vertical section taken through a fluid actuated valve which operates automatically to control the flow of a fluid, for example compressed air, and thereby operate the mechanism that lowers the trolley pole. This view shows a portion of the actuating cylinder broken away.
Fig. 3 is a vertical section taken through the upper end of the trolley pole and the lower portion of the harp, and illustrating the control valve and the manner in which the movement of the harp may effect the actuation of the control valve.

When the valve is raised off its seat, air can pass up the ducts 22 and 23, flow past the valve and out into the atmosphere through a side port 25 below the valve. This side port is indicated in Fig. 3. Any suitable mechanism may be employed for utilizing this release of air to effect the desired movements. In the present instance the trolley pole is actuated by a fluid operated cylinder 26 (see Fig. 1) that is mounted in an inclined position on trunnions such as the trunnion 27, said trunnions being mounted in the forks 28 of a fixed bracket.

A piston rod 28a connected with a piston within this cylinder is rigidly attached at its outer end to an arm 29 that extends over and is clamped rigidly to the trolley pole 2.

The lower head 30 of the cylinder 26 is supplied with the operating fluid, such as compressed air, through a flexible tube 31, that leads off from the side of a fluid-operated valve 32, illustrated in detail in Figure 2. Referring to this figure, this valve is in the form of a cylinder which may be cast integral with the shell of the cylinder 26. Through the inner head 33 of this cylinder, the compressed air is admitted by pipe 34. The lower end of this pipe is connected to an air supply on the car. The head 33 has a boss 35 against which a tubular or cup-shaped valve member 36 normally seats, being held, normally, against the boss by a coil spring 37 in the valve chest 38. The opposite head 39 is connected by a flexible tube 40 with a collar 41 attached to the trolley pole near its lower end and opens communication with an air duct 22, already described, that extends down the pole from the control valve 19. The valve member or piston 36 is provided with a waist of reduced diameter so that an annular chamber 42 is formed around the valve member and between it and the wall of the valve cylinder. In other words, the valve member has a main head 43 and an outer head 44 between which the chamber 42 is located. In the position of rest of the valve member shown in Figure 2, this chamber 42 opens communication from the pipe 31 to air vents 45 formed in the side wall of the valve cylinder. A bleeder port 43a is provided through the head 43 to equalize pressure in both ends of the valve chest.

The spring 37, when the pressure equalizes, holds the valve member 36 normally in the position in which it is shown in Fig. 2. At this time, air pressure is maintained in the annular chamber 46 around the boss 35 and adjacent to the head 33 of the valve chest. For this purpose small ports in the form of notches 47 may be formed in the boss.

In this position of the valve member 36 the lower end of the fluid operated cylinder 26 is vented to the atmosphere through the flexible tube 31 and through the chamber 42 and the air vents 45.

In the operation of the apparatus, when the trolley wheel 10 comes off the trolley wire 11, the spring 17 causes an immediate rotation of the harp 12 on the pivot pin 14. This causes the toe 20 to open the control valve 19 thereby permitting escape of air up the duct 22 from the valve chest 38. This unbalances the forces on the valve member 36 that are holding it in the position illustrated in Figure 2, whereupon the air pressure in the lower end of the cylinder will move the valve upwardly until its upper end strikes the head 39. When this movement has taken place, the head 43 of the valve member will have moved sufficiently to permit the compressed air to flow in through the pipe 34 and out of the valve chest through the tube 31, thereby admitting the compressed air into the lower end of the operating cylinder 26. This will cause the piston rod 28 to move upwardly, thereby causing a lowering of the trolley pole 2.

This will hold the trolley wheel down out of contact with the overhead work. It is unnecessary for the motorman to shut off the air in the pipe 34, because as soon as the trolley rope 48 is pulled down, the harp 12 permits the control valve 19 to close.

In case the trolley pole carries the trolley wheel on a spring frame, as is sometimes done, the movement of a part of this frame would be utilized to open the valve 19.

It is understood that the embodiment of the invention described herein is only one of the many embodiments this invention may take, and I do not wish to be limited in the practice of the invention, nor in the claims, to the particular embodiment set forth.

What I claim is:

1. In a trolley retriever for electric cars, the combination of a pole mounted at its base on the car, a harp carrying the trolley wheel, means for movably supporting the harp on the upper end of the pole operating to permit movement of the harp relative to the pole, when the wheel gets off the trolley, a pneumatic cylinder mounted on the car roof and connected with the pole to lower the same, a pneumatically actuated valve for controlling flow of compressed air to the pneumatic cylinder, a single air duct leading from the pneumatic valve to the upper end of the pole, and means for liberating compressed air from said duct when the wheel comes off the wire, to actuate the pneumatically controlled valve and lower the pole.

2. In a trolley retriever for electric cars, the combination of a pole mounted at its base on the car, a harp carrying the trolley wheel, means for movably supporting the harp on the upper end of the pole operating to permit movement of the harp relative to the pole when the wheel gets off the trolley, said pole having a pneumatic duct, with a control valve held closed by the pneumatic pressure actuated by the harp when the wheel is off the trolley wire, to permit compressed air to escape to the atmosphere, a pneumatic cylinder connected with the pole for lowering the same, and a pneumatically controlled valve actuated through the agency of the escape of the compressed air to move the pneumatic valve and actuate the pneumatic cylinder.

3. In a trolley retriever for electric cars, the combination of a pole mounted at its base on the car, a harp carrying the trolley wheel, means for movably supporting the harp on the upper end of the pole operating to permit movement of the harp relative to the pole when the wheel gets off the trolley, a spring normally held in compression by the harp when the wheel is on the trolley wire, and operating to move the harp relative to the pole when the wheel comes off the trolley, a pneumatic cylinder connected with the pole for lowering the same, a compressed air duct, a valve in said duct opening to the atmosphere, held closed by the pneumatic pressure, and having an actuating means actuated by the spring when the wheel is off, and means for actuating the pneumatic cylinder through the agency of the said valve to liberate compressed air to the atmosphere.

4. In a trolley retriever for electric cars, the combination of a pole mounted at its base on the car, a harp carrying the trolley wheel, means for movably supporting the harp on the upper end of the pole operating to permit movement of the harp relative to the pole when the wheel gets off the trolley, a pneumatic cylinder for lowering the pole, a pneumatic valve for the cylinder, an air duct leading from the same to the harp, a release valve in the duct near the harp and held closed by the pneumatic pressure, means for engaging the release valve to effect the release of air to the atmosphere by said harp from said duct when the trolley is off, and thereby operating the pneumatic valve to actuate the pneumatic cylinder to lower the pole.

5. In a trolley retriever for electric cars, the combination of a pole mounted at its base on the car, a harp carrying the trolley wheel, means for movably supporting the harp on the upper end of the pole operating to permit movement of the harp relative to the pole when the wheel gets off the wire, a pneumatic cylinder for lowering the pole, a pneumatic valve for the cylinder, said valve having a casing with a piston therein with a spring normally holding the piston in an extreme position, a port for admitting compressed air on the side of the piston remote from the spring, said valve casing having an air chamber receiving said spring at its end opposite said port, so that compressed air is normally held in the same end of the valve casing as the spring and means actuated by the harp when the trolley is off, to release the air at the harp from said air chamber and admit compressed air past the said valve to the said cylinder.

6. In a trolley retriever for electric cars, the combination of a pole mounted at its base on the car, a harp carrying the trolley wheel, means for movably supporting the harp on the upper end of the pole operating to permit movement of the harp relative to the pole when the wheel gets off the wire, a pneumatic cylinder mounted on the car and connected with the pole for pulling it down, a pneumatic valve cooperating with the cylinder to control the flow of compressed air to the cylinder, said pole having a duct leading from the pneumatic valve to a point near the harp, and a control valve adjacent the harp, a spring normally holding the same closed, said harp having means for engaging and opening the control valve and release compressed air from the duct when the wheel becomes dislodged from the trolley wire, said pneumatic valve and cylinder cooperating when compressed air is released at the harp, to retrieve the pole.

7. In a trolley retriever for electric cars, the combination of a pole mounted at its base on the car, a harp carrying the trolley wheel, means for movably supporting the harp on the upper end of the pole operating to permit movement of the harp relative to the pole when the wheel gets off the wire, a pneumatic cylinder mounted on the car and connected with the pole for pulling it down, a pneumatic valve cooperating with the cylinder to control the flow of compressed air to the cylinder, said pole having a duct leading from the pneumatic valve to a point near the harp, and a control valve adjacent the harp, a spring normally holding the same closed, said harp operating to open the control valve and release compressed air from the duct when the wheel becomes dislodged from the trolley wire, said pneumatic valve and cylinder cooperating when compressed air is released at the harp, to retrieve the pole, said pneumatic valve having a piston therein with a bleeder port for permitting compressed air to pass the same in reaching the said duct.

8. In a trolley retriever for electric cars, the combination of a pole mounted at its base on the car, a harp carrying the trolley wheel, means for movably supporting the harp on the upper end of the pole operating to permit movement of the harp relative to the pole when the wheel gets off the wire, a pneumatic cylinder mounted on the car and connected with the pole for pulling it down, a pneumatic valve cooperating with the cylinder to control the flow of compressed air to the cylinder, said pole having a duct leading from the pneumatic valve to a point near the harp, and a control valve adjacent the harp, a spring normally holding the same closed, said harp operating to open the control valve and release compressed air from the duct when the wheel becomes dislodged from the trolley wire, said pneumatic valve and cylinder cooperating when compressed air is released at the harp, to retrieve the pole, said pneumatic valve having a piston therein with a bleeder port for permitting compressed air to pass the same in reaching the said duct, and a spring in the pneumatic valve normally holding its piston in an extreme position, said piston operating when the air is released at the harp to move toward the other end of the pneumatic valve casing and compressing the spring, said pneumatic valve having a port for passing compressed air from the valve to the pneumatic cylinder when the valve piston moves in the direction to compress the spring.

Signed at Los Angeles, California, this 8th day of August, 1930.

LEWIS B. WITHERS.